United States Patent
Clinard et al.

(10) Patent No.: US 6,324,794 B1
(45) Date of Patent: Dec. 4, 2001

(54) DEVICE USING COMPRESSIBLE FLUID AS SWITCHABLE FLUID SPRING FOR SHOCK AND VIBRATION ISOLATION AND MITIGATION

(75) Inventors: R. Leon Clinard, Paris, IL (US); Scott Taylor, Amherst, NY (US); Kenichi Tomita, Williamsville, NY (US); Benjamin T. Houghton, Buffalo, NY (US)

(73) Assignee: Enidine, Inc. (US)

( * ) Notice: Subject to any disclaimer, the term of this patent is extended or adjusted under 35 U.S.C. 154(b) by 0 days.

(21) Appl. No.: 09/439,882

(22) Filed: Nov. 12, 1999

(51) Int. Cl.[7] .......................................... E04B 1/98
(52) U.S. Cl. ................... 52/167.1; 52/167.2; 52/167.5; 52/1
(58) Field of Search ................ 52/167.1, 167.2, 52/167.5, 1

(56) References Cited

U.S. PATENT DOCUMENTS

| | | | |
|---|---|---|---|
| 2,053,226 | * 9/1936 | Ruge | 52/113 |
| 5,046,290 | * 9/1991 | Ishit et al. | 52/1 |
| 5,107,634 | * 4/1992 | Onoda et al. | 52/1 |
| 5,255,764 | * 10/1993 | Kurabayashi et al. | 52/1 X |
| 5,491,938 | * 2/1996 | Niwa et al. | 52/167.1 |
| 5,526,609 | 6/1996 | Lee et al. | |
| 5,540,522 | * 7/1996 | Launaro et al. | 52/167.1 X |
| 5,576,971 | * 11/1996 | Ishii et al. | 52/1 X |
| 5,666,770 | * 9/1997 | Sato et al. | 52/167.2 |
| 5,727,663 | * 3/1998 | Taylor | 52/167.1 X |
| 5,765,313 | 6/1998 | Lee et al. | |

* cited by examiner

Primary Examiner—Beth A. Stephan
Assistant Examiner—Brian E. Glessner
(74) Attorney, Agent, or Firm—Wall Marjama & Bilinski

(57) ABSTRACT

Apparatus is disclosed for protecting a structural object from the potentially harmful effects of a cyclic event such as an earthquake or high wind loads. A fluid spring is employed to stiffen the structural object and absorb kinetic energy stored by the spring. Fluid from the spring is exchanged with an accumulator where kinetic energy is dissipated as heat. A flow circuit regulates the exchange of fluid between the spring chamber and the accumulator chamber under controlled conditions to absorb the harmful effects of high external loads and to release the structural object when a high shock load is experienced.

13 Claims, 4 Drawing Sheets

DEVICE USING COMPRESSIBLE FLUID AS SWITCHABLE FLUID SPRING FOR SHOCK AND VIBRATION ISOLATION AND MITIGATION

BACKGROUND OF THE INVENTION

This invention relates to a fluid spring for protecting a structural element from the potential effects of a cyclic event.

In U.S. Pat. Nos. 5,526,609 and 5,765,313 to Lee et al. there is disclosed both method and apparatus for a real time structural parameter modification (RSPM) in which a mechanical spring is engaged and disengaged with a structural element by means of a hydraulic switch. When engaged, the spring acts to stiffen the structural element and store energy when the structure experiences a potentially harmful cyclic event. The stored energy is released from the system by disengaging the spring from the structural element. After the stored energy is released, the structural element is once again engaged by the spring and the cycle is repeated.

In the RSPM system the mechanical spring and the hydraulic switch are separate elements. The size of the apparatus, and in particular the spring, are relatively large and thus occupy a good deal of space. The reaction time needed to engage and disengage the spring is also relatively long diminishing the ability of the system to react to high shock loads. Any delay in responding to high shock loads can result in unacceptable G-loads.

SUMMARY OF THE INVENTION

It is a primary object of the present invention to improve apparatus used to protect structures from the potentially harmful effects caused by a cyclic event.

It is a further object of the present invention to reduce the size of apparatus used to protect a structural object during a cyclic event such as an earthquake or a high wind storm.

It is a still further object of the present invention to increase the response time of apparatus designed to protect a structure from a cyclic event and, in particular, against the harmful effect of high external shock loads.

Another object of the present invention is to eliminate the need for a mechanical spring in apparatus for protecting a structural object from the harmful effects of a cyclic event.

Still another object of the present invention is to combine a fluid spring and a fluid damper within a common cavity and regulate the exchange of fluid between the two devices and an accumulator to protect a structure against the potentially harmful effects of a cyclic event.

These and further objects of the present invention are attained by means of apparatus for protecting a structural object from the harmful effects of a cyclic event and includes a fluid spring in which the fluid spring chamber is housed within a manifold and a piston is slidably contained within the chamber. A piston rod is secured at one end to the piston and passes out of the chamber through one side of the manifold. The other end of the rod is connected to a second structural member and the manifold is connected to a first structural member. The spring chamber is filled with a compressible fluid and is placed in fluid flow communication with an accumulator chamber by means of a flow circuit whereby fluid is exchanged between the spring chamber and the accumulator chamber when the structure experiences a cyclic load. In the preferred embodiment of the invention, a flow circuit under the control of a microprocessor controls the exchange of fluid between the fluid spring and the accumulator. Initially, when the structure experiences a cyclic event, the fluid in the spring chamber stores energy and the pressure in the chamber rises. A sensor monitors a system characteristic that is indicative of the pressure in the spring chamber and, through the microprocessor, causes a control valve to be cycled allowing high pressure fluid in the spring chamber to move to the accumulator where it is dissipated as heat. A check valve in the flow circuit is arranged to open when the accumulator pressure exceeds the spring chamber pressure thus refilling the spring chamber when the load on the structure is reduced. A relief valve is also contained in the flow circuit which is adapted to open automatically when the structure experiences a dangerously high shock load permitting fluid in the spring chamber to rapidly move into the accumulator which, in effect, releases the structure from the fluid spring.

In another form of the invention a damper chamber is placed in back to back relationship with the spring chamber within a common cavity and is separated from the spring chamber by the piston. A second flow circuit connects the damper chamber to the accumulator to control the rate of return of the piston and absorb energy from the system as the structure is recovering from a cyclic load thereby providing the capability to remove kinetic energy from the system during the return mode of the piston. A check valve in the flow circuit is arranged to open when the accumulator pressure exceeds the damper chamber pressure thus refilling the damper chamber. A relief valve is provided in the flow circuit which opens automatically when the pressure in the damper chamber reaches a value indicating that the structure is again experiencing a load which is higher than desirable, whereupon the fluid in the damper chamber is permitted to rapidly move into the accumulator chamber.

In still another embodiment of the invention, a pair of fluid spring chambers are placed in a back to back relationship within a common cavity and, are separated by a piston. Each spring chamber communicates with the accumulator as described above through separate but identical flow circuits so that cyclic loads acting on either side of the piston can be absorbed by the unit.

BRIEF DESCRIPTION OF THE DRAWING

For a better understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
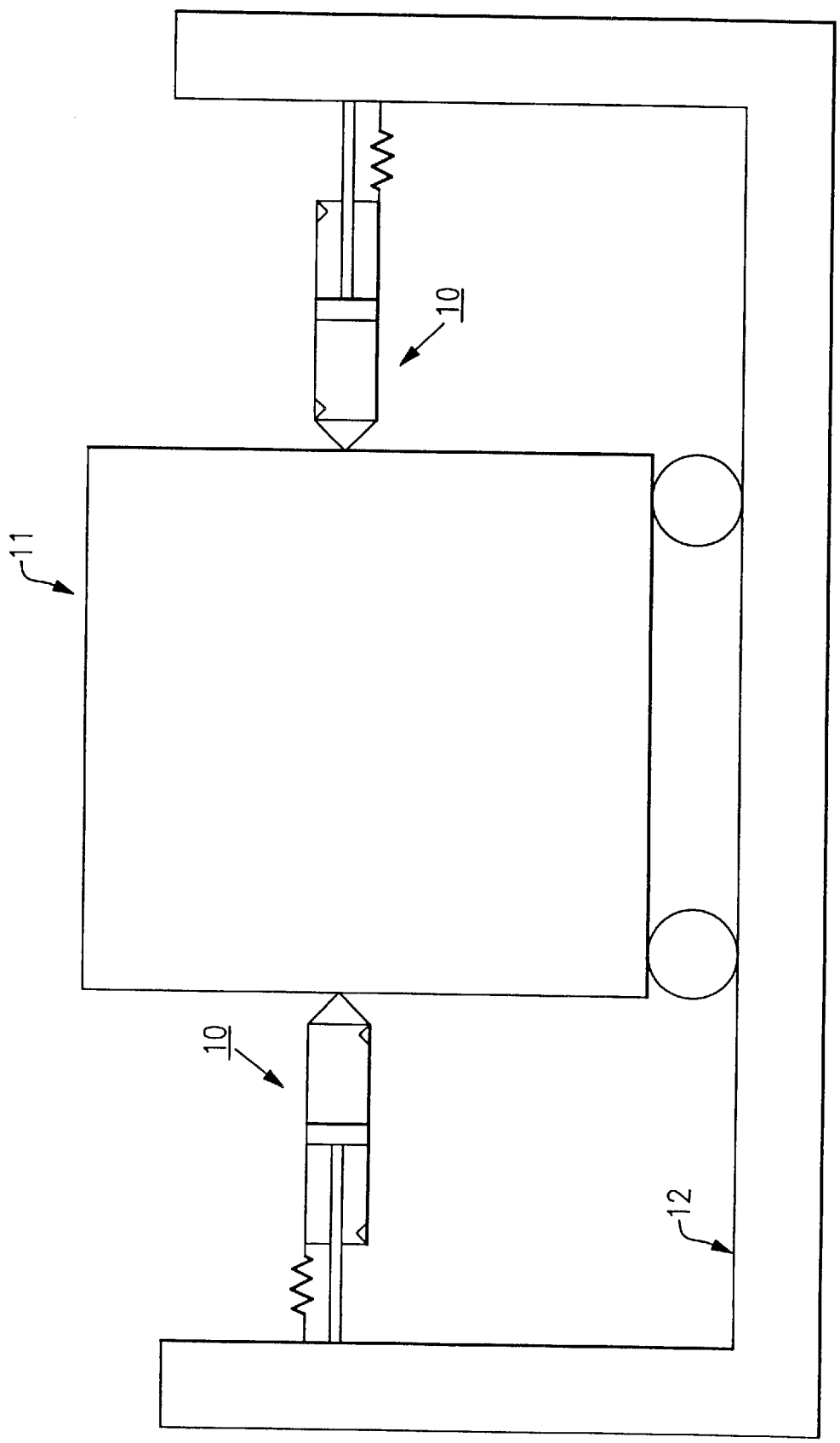
FIG. 1 is a schematic representation showing the apparatus of the present invention mounted within a structure.

FIG. 1 illustrates one application of the present invention wherein a pair of fluid spring units, generally referenced 10 embodying the present invention, are placed between two structural members 11 and 12. Although the fluid spring units are illustrated in this specific configuration, it should be clear that one or more units can be configured in any suitable arrangement to provide protection for a structure or object against a potentially harmful cyclic event such as an earthquake or a high wind load. As will be explained in greater detail below, each unit contains a fluid spring that is adapted to exchange fluid with an associated accumulator to provide additional stiffness to a structure experiencing high externally induced loads. The fluid in the spring chamber stores the externally induced load as energy and the stored energy is ultimately dissipated as heat in the accumulator. In the preferred embodiment of the invention, the exchange of fluid between the spring chamber and the accumulator is regulated by a microprocessor acting through a valve network. The fluid spring also acts as a function switch to release the structural member in the event the structure experiences an excessively high load as typically produced by a shock wave.

Figure 2:
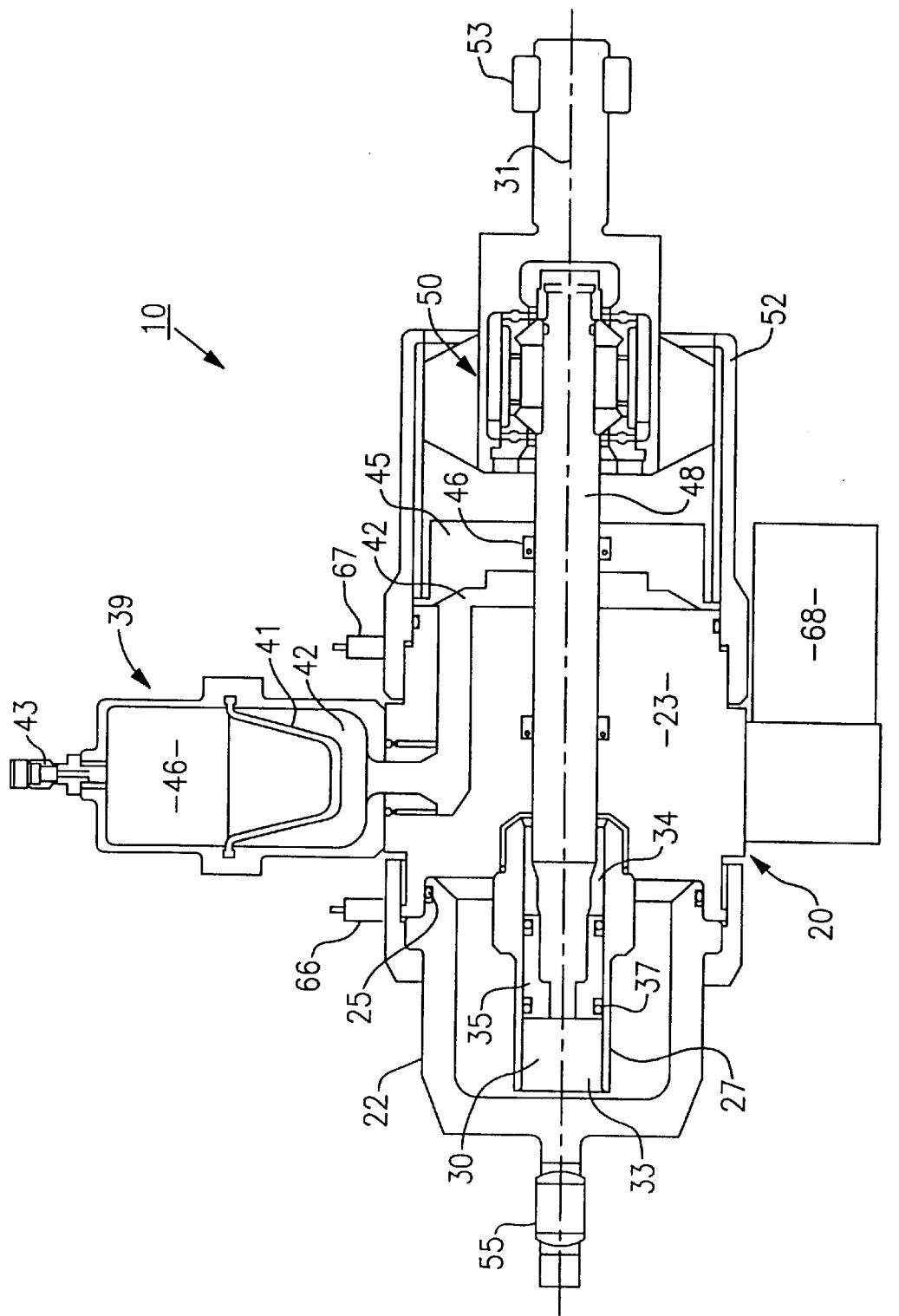
FIG. 2 is a side elevation in section showing the apparatus of the present invention in greater detail.

Turning now to FIG. 2, there is shown in section an enlarged side elevation of a fluid spring unit 10 embodying the teachings of the present invention. The unit includes a two piece manifold 20 that includes a nose section 22 and a body section 23 that are joined together by any suitable means. Seals 25 are mounted in the joint region between sections to render the interior of the manifold fluid tight. A shock tube 27 is mounted in the forward part of the manifold and contains a cylindrical cavity 30 that is axially aligned with the axis 31 of the unit. The cavity is divided into a forward fluid spring chamber 33 and a rear damper chamber 34 by a piston 35. Seals 37 prevent fluid contained in the two chambers from passing around the piston. In operation, each chamber is completely filled with a compressible fluid. Any suitable compressive fluid can be used in the practice of the invention.

An accumulator, generally referenced 39, is shown mounted upon the manifold 20. The accumulator is of well known construction and contains a charging section 40 that is separated by a flexible member 41 from the accumulator fluid chamber 42. A charging valve 43 is mounted in the charging section through which gas under pressure is brought into the charging section to raise the pressure of fluid contained in the accumulator chamber to a desired operating level. As illustrated, the accumulator fluid chamber passes downwardly behind the manifold and is closed by a rear wall 45 and appropriate seals 46. Although the accumulator is shown in the preferred embodiment of the invention mounted upon the manifold, it should be evident to one skilled in the art that the accumulator may be mounted in any suitable location integral or close to or remote from the manifold without departing from the teachings of the present invention. The spring chamber and the damper chamber are each connected to the accumulator chamber through separate flow control circuits, the function of which will be explained in greater detail below.

Figure 3:
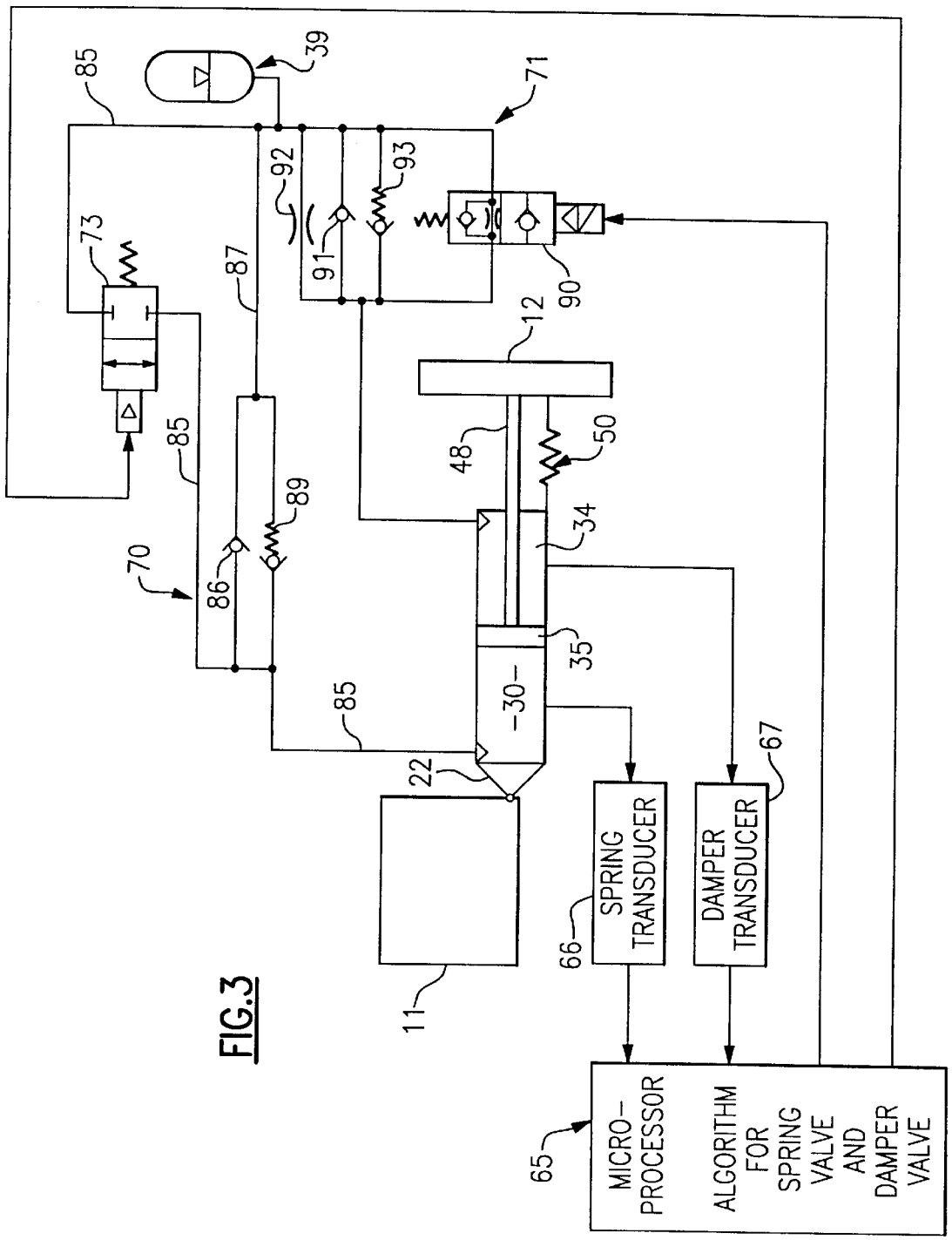
FIG. 3 is a schematic representation diagram further illustrating the flow control circuitry employed in the apparatus illustrated in FIG. 2.

As illustrated in FIG. 3, preferably the unit will include a microprocessor 65 which will, among other things, monitor the pressure in the spring chamber by means of a pressure transducer 66 and the pressure in the damper chamber by means of a second pressure transducer 67. As will be explained in further detail below, the microprocessor processes the pressure information and uses the data to cycle valves in control flow circuits through which fluid is exchanged between the spring and damper and the accumulator. Although direct pressure readings are employed in this preferred embodiment of the invention, it should be further evident to one skilled in the art that any one of many variable properties of the system can be measured to determine the fluid pressure within the spring chamber and the damper chamber. These properties include, but are not limited to, acceleration and velocity measurements of various system components as well as displacement and strain measurements.

A piston rod 48 is secured to the piston 35 and extends back through the damper chamber. The distal end of the piston rod passes through the rear wall of the manifold and is supported in a shear spring assembly generally referenced 50. The shear spring unit is mounted in a sleeve 52 which also houses a part of the manifold so that the static load of the piston rod is supported by the sleeve. A connector 53 is also mounted in the shear spring assembly and is arranged to connect one end of the fluid spring unit to a structural element. A second connector 55 is integral with the nose section of the manifold and is arranged to connect the opposite end of the unit to another structural element. It should be noted that in some applications, the need for a shear spring assembly will not be required and the assembly can be eliminated from the unit.

A service module 68 is mounted on the under side of the manifold and contains one or more valves used in the operation of the present apparatus, the function of which will be described in further detail below. Electronic components associated with the valves stored in the module are similarly located in the module. However, many of these components may be remotely situated from the module.

Turning now to FIG. 3, there is illustrated a schematic diagram of the hydraulic system associated with the present system. The nose section 22 of the manifold is connected to a first structural member, such as structure 11 shown in FIG. 1, and the distal end of the piston rod 48 is connected to a second structural object such as structure 12 shown in FIG. 1. The spring chamber pressure transducer 66 monitors the pressure in the spring chamber 30 and sends a signal indicative of the pressure in the chamber to the microprocessor 65. The damper chamber pressure transducer 67 is similarly adapted to sense the pressure in the damper chamber 34 and sends a second signal indicative of the damper chamber pressure to the microprocessor. The microprocessor contains a suitable algorithm for controlling control valves associated with the spring and damper flow circuits which are designated 70 and 71, respectively.

Upon the sensing of an initial indication of the onset of a cyclic event which manifests itself by a rise in the spring chamber pressure reaching some predetermined criteria, the microprocessor instructs the spring control valve 73 to open thereby placing the spring chamber in communication with the accumulator via flow line 85. In the event structure 11 is caused to deflect such that unit A is compressed inwardly toward the spring chamber, the piston is compressed into the spring chamber thereby increasing the pressure in the chamber and storing energy. When the microprocessor instructs the spring control valve to open, the compressed fluid flows from the spring chamber into the accumulator where the stored energy is dissipated in the form of heat.

A spring refill check valve 86 is mounted in line 87 and is arranged to open when the pressure in the accumulator is greater than that in the spring chamber. This occurs when unit A starts to recover and move back towards its initial position.

A spring relief check valve 89 is also mounted in parallel with the spring refill valve and is arranged to open at a predetermined pressure in the spring chamber. The relief valve is preset to open immediately when the pressure in the spring chamber reaches a level indicating the structure is experiencing an excessively high shock load. The flow rate for the spring relief valve is high enough to permit compressed fluid in the spring chamber to rapidly escape to the accumulator thereby releasing the spring from the associated structure.

The damper flow circuit 71 is arranged to act in concert with the fluid spring to absorb energy from the system and control the return of the structure from a deflected condition back to its original condition. The damper flow circuit includes a damper control valve 90. Deflection of the structure 12 compresses the fluid in the spring of unit A causing the pressure in the damper chamber of unit A to decrease and the damper refill check valve 91 to open thereby keeping the damper chamber filled with fluid. Upon the removal or reversing of the external force on the structure, the structure starts to return to its original position and the piston is drawn back into the damper chamber. Depending on the amount of damping desired, if any, the microprocessor signals the damper control valve to open or close. This signal determines the amount of damping obtained. Damping is obtained by forcing fluid in the damper chamber through return orifice 92 back to the accumulator. The size of the return orifice controls the rate of return of the deflected structure.

A damper relief valve 93 is also placed in parallel with the damper control orifice and the damper refill valve. The relief valve 93 is preset to open when the pressure in the damper chamber exceeds a preset value. The relief valve is designed to open when the acceleration of the recovering structure exceeds a predetermined rate.

As should be evident from the description above, the spring chamber incorporates pressure sensitive valves which limit the amount of shock that can be transmitted to the protected structural elements and, at the same time, serves to remove energy stored in the fluid due to external cyclic loads. The valves ensure that the fluid spring also provides a minimal time response to shock loading. Additionally, the use of a fluid spring in association with an accumulator reduces the size of the isolator when compared to those presently in use, while at the same time, improves the device's shock isolating capabilities. Use of a compressible fluid further allows for a fluid damper to be incorporated into the unit again conserving space while increasing the performance density of the unit.

Figure 4:
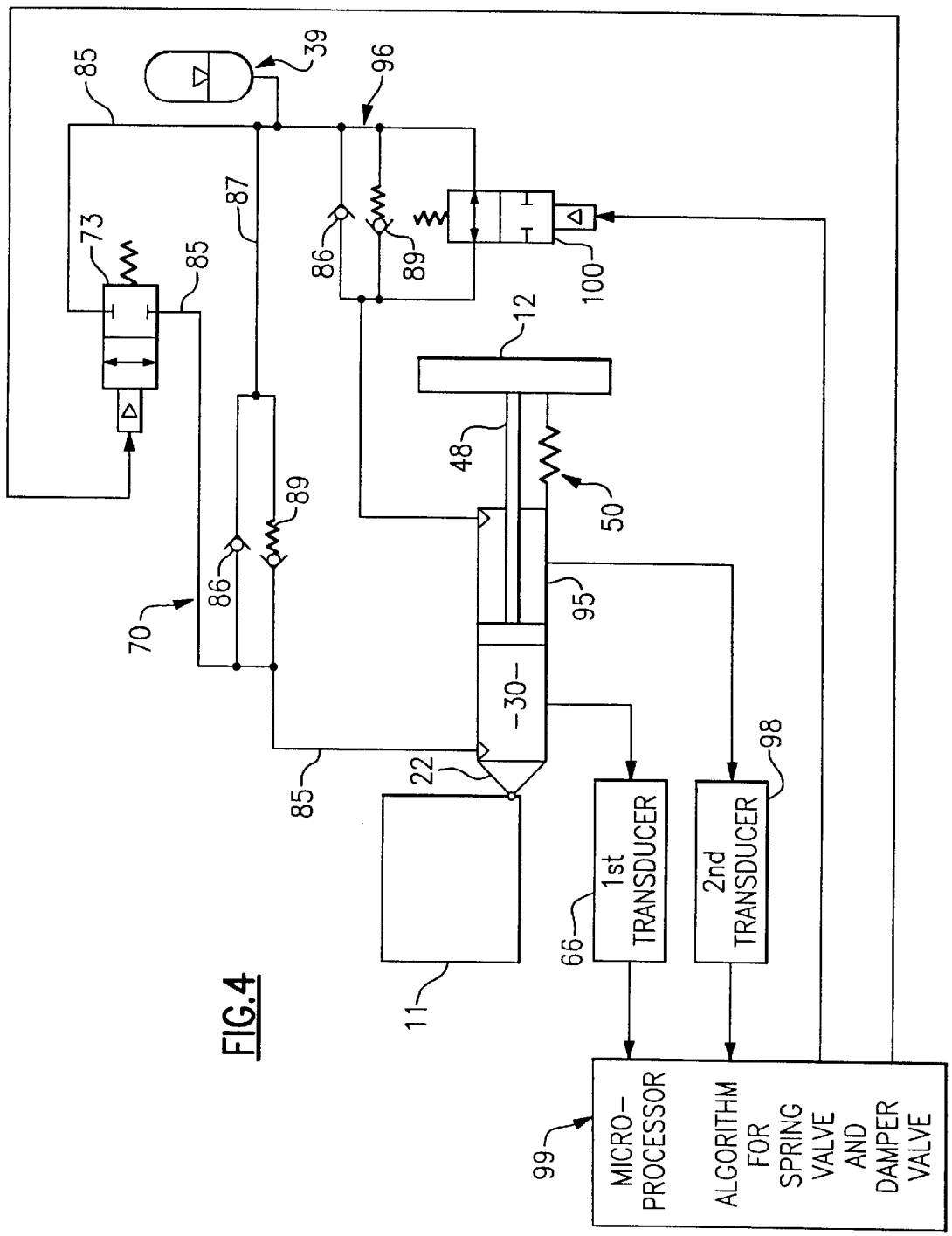
FIG. 4 is a schematic representation illustrating a further embodiment of the invention.

Turning now to FIG. 4, there is illustrated in schematic form a further embodiment of the invention wherein like numerals are used to identify like components referred to above in association with FIG. 3. In this embodiment of the invention the damper chamber 34 illustrated in FIG. 3 is replaced by a second spring chamber 95 which is connected to the accumulator by a second spring fluid flow circuit 96 that contains the same valve arrangement and which functions in the same manner as the first flow circuit so that the unit can operate in both directions of movement of the piston and a fluid spring. A second spring transducer 98 is arranged to sense the fluid pressure in the second spring chamber and send the sensed data to the microprocessor 99 where it is processed. The microprocessor sends an output signal to a second spring control valve 100 which activates the second spring flow circuit as explained above.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. Apparatus for protecting structural members within a structural system from the harmful effects of an externally induced cyclic event that includes:
    a fluid spring that further includes a manifold containing a spring chamber, a piston slidably contained within the spring chamber and a compressible fluid filling said spring chamber,
    said piston having a solid unpenetrated body and further includes seal means for preventing fluid from passing around or through said piston as it moves within the spring chamber,
    a piston rod having a proximal end connected to the piston and a distal end passing out of one end of said manifold,
    said distal end of the piston rod having a first connector for connecting the rod to a first structural member within the system and said manifold having a second connector for connecting the manifold to a second structural member within the system;
    a sensor means for sensing a variable property of a system related component that is indicative of the pressure produced in the spring chamber by an external cyclic event and providing an output signal indicative of the fluid pressure in the spring chamber;
    a fluid circuit located outside of said manifold for placing the spring chamber in fluid flow communication with a remote accumulator chamber and controlling the exchange of fluid between the spring chamber and the accumulator chamber;
    said fluid circuit further including:
        a control valve capable of being cycled between an open and closed position, said control valve being cycled to an open position when the sensed variable property meets a predetermined criteria indicating that the fluid pressure within the spring chamber is greater than that in said accumulator chamber thereby placing the spring chamber in direct fluid flow communication with said accumulator chamber whereby fluid in the spring chamber is transferred to the accumulator chamber;
        a refill check valve that is arranged to open automatically when the fluid pressure in the accumulator chamber exceeds the fluid pressure in the spring chamber wherein fluid is returned directly to the spring chamber from the accumulator chamber; and
        a relief valve that is arranged to open when the fluid pressure in the spring chamber exceeds a predetermined value indicative of an excessive shock load on the system wherein fluid in said spring chamber is rapidly transferred into the accumulator chamber thereby releasing the spring chamber from the structure.

2. The apparatus of claim 1 wherein said control valve is cycled from a normally closed position to an open position when the sensed system component property meets the given criteria.

3. The apparatus of claim 1 wherein said sensor means is a pressure transducer for sensing the fluid pressure with the spring chamber.

4. The apparatus of claim 1 that further includes a support means for supporting the static load of the piston rod.

5. The apparatus of claim 1 that further includes a microprocessor for processing an output signal from the sensor means and producing an input signal to the control valve for cycling said control valve when the sensed system component property criteria is met.

6. The apparatus of claim 5 wherein said sensed system component property may be selected from one of a group of properties consisting of pressure acceleration, velocity, distance traveled or strain imposed upon the system component.

7. Apparatus for protecting a structural object within a structural system from the harmful effects of an externally induced cyclic event that includes:
   a manifold having an elongated cavity that slidably contains a piston for separating the cavity into a spring chamber and a damper chamber, said chambers being filled with a compressible fluid,
   said piston having a solid unpenetrated body and further including seal means for preventing fluid from passing around said piston so that the spring chamber is isolated from the damper chamber,
   a piston rod connected at its proximal end to said piston, said rod passing through one of said chambers and the distal end of said rod extending outwardly beyond one end wall of said one chamber,
   said distal end of said piston rod being connectable to a first structural member in the system and said manifold being connectable to a second structural member in the system,
   sensor means for sensing a variable property of a system related component that is indicative of the pressure in the spring chamber and in the damper chamber and producing an output signals indicative of the fluid pressure in each chamber,
   a first fluid circuit located outside of said manifold for placing the spring chamber in fluid flow communication with a remote accumulator chamber and controlling the exchange of fluid between the spring chamber and the accumulator chamber,
   said first fluid circuit further including
      a spring chamber control valve that is cycled when the sensed fluid pressure in the spring chamber meets a given criteria, wherein higher pressure fluid is transferred directly from the spring chamber to the accumulator chamber,
      a spring chamber refill check valve arranged to automatically return fluid directly from the accumulator chamber to the spring chamber when the fluid pressure in the accumulator chamber is greater than the fluid pressure in the spring chamber, and
      a spring chamber pressure relief valve that is arranged to open when the fluid pressure in the spring chamber exceeds a predetermined value indicative of an excessive shock load on the system wherein fluid in said spring chamber is rapidly transferred into the accumulator chamber thereby releasing the spring chamber from the structure,
   a second fluid circuit located outside of the manifold for placing the damper chamber in fluid flow communication with said remote a accumulator chamber and controlling the exchange of fluid between the damper chamber and the accumulator chamber,
   said second fluid cotrol circuit further includes
      a damper chamber control valve that is cycled when sensed fluid pressure in the damper chamber meets a given criteria so that fluid is exchanged directly between the damper chamber and said accumulator chamber,
      an orifice for controlling the rate of flow moving from the damper chamber to the accumulator chamber when said piston moves to compress fluid in the damper chamber,
      a damper chamber refill check valve that opens automatically when the accumulator chamber fluid pressure exceeds the fluid pressure in the damper chamber to return fluid to the damper chamber when said piston moves to reduce the fluid pressure in the damper chamber; and
      a damper chamber pressure relief valve that is adapted to open when the pressure in the damper chamber exceeds a predetermined value.

8. The apparatus of claim 7 wherein said spring control valve is cycled from a normally closed condition to a normally open condition when the sensed system component property meets a given criteria.

9. The apparatus of claim 7 wherein said sensor means includes a first pressure transducer for sensing the pressure in the spring chamber and a second pressure transducer for sensing the pressure in the damper chamber.

10. The apparatus of claim 7 that further includes a support means for supporting the static load of the piston rod.

11. The apparatus of claim 7 that further includes a microprocessor for processing the output of said sensor means and providing an input signal to the control valves for cycling said control valves.

12. The apparatus of claim 11 wherein said sensed system component property may be selected from a group of properties that include acceleration, velocity, distance traveled or strain imposed upon the system component.

13. Apparatus for protecting a structural object within a structural system from the harmful effects of an externally induced cyclic event that includes
   a manifold having an elongated cavity that slidably contains a piston for separating the cavity into a pair of fluid spring chambers, said chambers being filled with a compressible fluid,
   a piston rod connected at its proximal end to said piston, said piston rod passing through one of said spring chambers and the distal end of the rod extending outwardly beyond one end wall of said cavity,
   said piston having a solid body and further includes seal means for preventing fluid from passing around or through said piston as it moves within the spring chamber,
   said distal end of said piston rod containing a connector for connecting the rod to a first structural member in the system and said manifold containing a connector for connecting the manifold to a second structural member in the system,
   sensing means for sensing a variable property of a system component that is related to the pressure in each of the spring chambers and providing a first and second output signals indicative of the fluid pressure in said first and second spring chambers,
   a first fluid circuit located outside of said manifold for placing the first spring chamber in fluid flow communication with a remote accumulator chamber and controlling the exchange of fluid between the first spring chamber and the accumulator chamber,
   a second fluid circuit located outside of said manifold for placing the second spring chamber in fluid flow communication with said remote accumulator chamber and controlling the exchange of fluid between the second spring chamber and the accumulator chamber.
   each flow circuit further including
      a control valve that is cycled when the sensed fluid pressure in the associated spring chamber meets a given criteria whereby high pressure fluid in said associated spring chamber is transferred from said associated spring chamber to the accumulator chamber, a return check valve arranged to automatically return fluid from the accumulator chamber to said associated spring chamber when the fluid pressure in the accumulator chamber is greater than the fluid pressure in said associated spring chamber, and a relief valve that is arranged to open when the fluid pressure in said associated spring chamber exceeds a predetermined value indicative of an excessive shock load on the system wherein fluid in said spring chamber is rapidly transferred into the accumulator chamber thereby releasing the associated spring chamber from the structure.

* * * * *